Nov. 22, 1966 L. S. STENSRUD 3,287,718
SUBSCRIBER ALARM SYSTEM
Filed March 10, 1964 3 Sheets-Sheet 1

INVENTOR.
Lloyd S. Stensrud
BY
Wilkinson, Mawhinney & Theibault
ATTORNEYS

INVENTOR.
Lloyd S. Stensrud
BY
Wilkinson, Mawhinney & Theibault
ATTORNEYS

Nov. 22, 1966 L. S. STENSRUD 3,287,718
SUBSCRIBER ALARM SYSTEM
Filed March 10, 1964 3 Sheets-Sheet 3

SEONDARY ALARM

INVENTOR.
Lloyd S. Stensrud
BY
Wilkinson, Mawhinney & Theibault
ATTORNEYS

United States Patent Office 3,287,718

Patented Nov. 22, 1966

3,287,718

SUBSCRIBER ALARM SYSTEM

Lloyd S. Stensrud, 601 9th Ave. W., Southwest Fargo, N. Dak.

Filed Mar. 10, 1964, Ser. No. 350,867

9 Claims. (Cl. 340—213.1)

This invention relates broadly to alarm systems and more particularly to a subscriber alarm system, wherein a central station is arranged to monitor one or more subscriber stations which may be remotely located.

One of the objects of the present invention is to provide a construction of subscriber alarm system having a simple and inexpensive means connecting each subscriber station to the central station.

Another object of the invention is to provide a subscriber alarm system which is simple and compact in construction, economical to manufacture, and is comprised of standard inexpensive components.

Another object of the invention is to provide a construction of subscriber alarm system which can be installed in any location with a minimum amount of difficulty.

A further object of the invention is to provide a construction of subscriber alarm system which is powered by existing line current sources available at the various installations and which can be easily switched to battery operation in the event of city electrical power failure.

Still a further object of the invention is to provide a subscriber alarm system in which the alarm at the subscriber station is not deactivated in the event of a complete failure of the central station alarm system.

Another object of the invention is to provide a subscriber alarm system having a novel forward and reverse warning circuit connecting the central and subscriber stations.

Other and further objects of the invention reside in the circuitry of the present invention which eliminates the necessity for constant testing of the operability of the alarm network, reduces maintenance to a minimum and provides no drain on the emergency battery power supplies when the system is operated on battery power in the normal manner. Other objects will also become apparent, to those skilled in the art, from the specification hereinafter following by reference to the accompanying drawings, in which.

Figure 1:
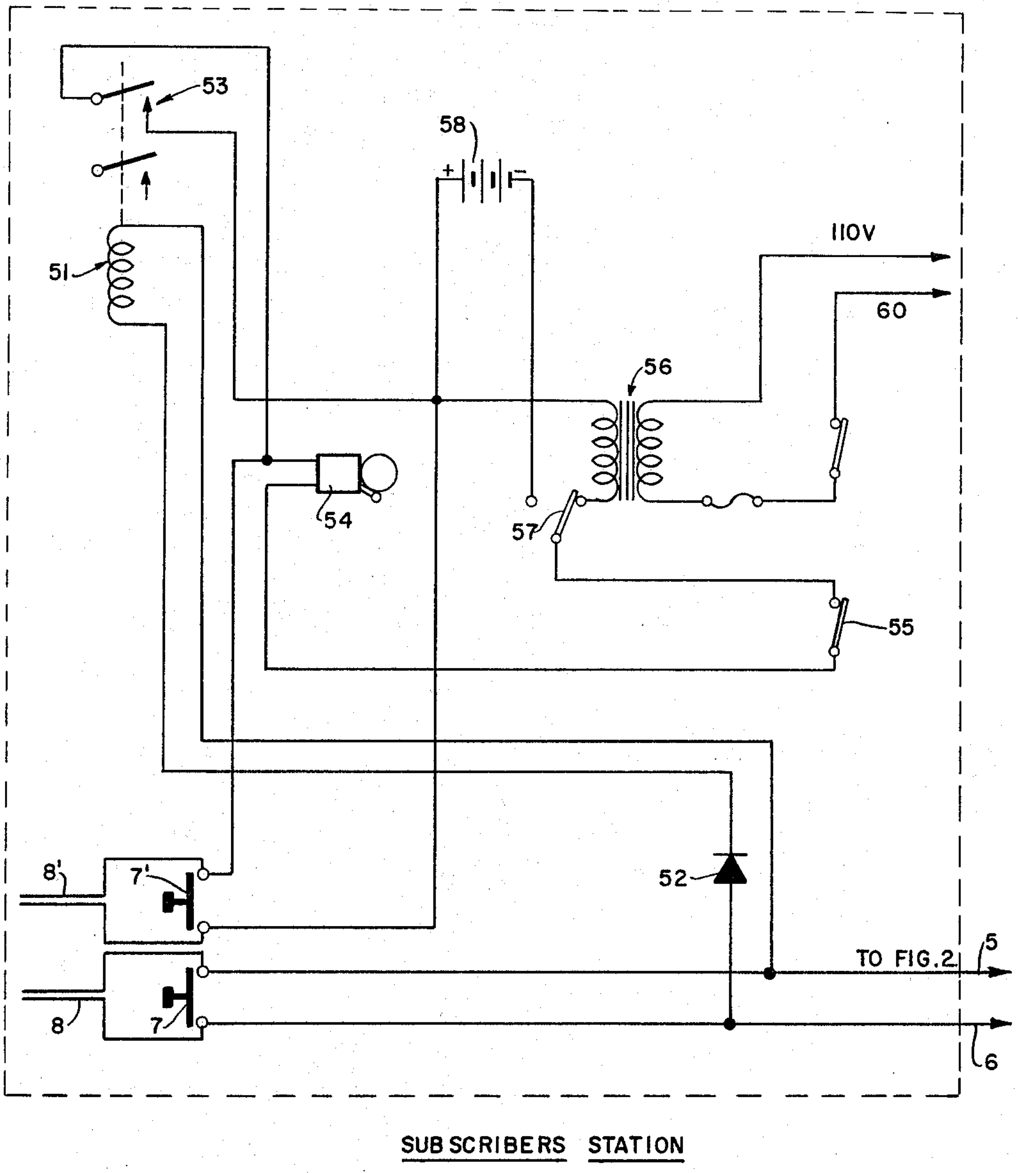
FIG. 1 is an electrical schematic diagram of the subscriber station circuitry of the alarm system of the invention.
Figure 2:
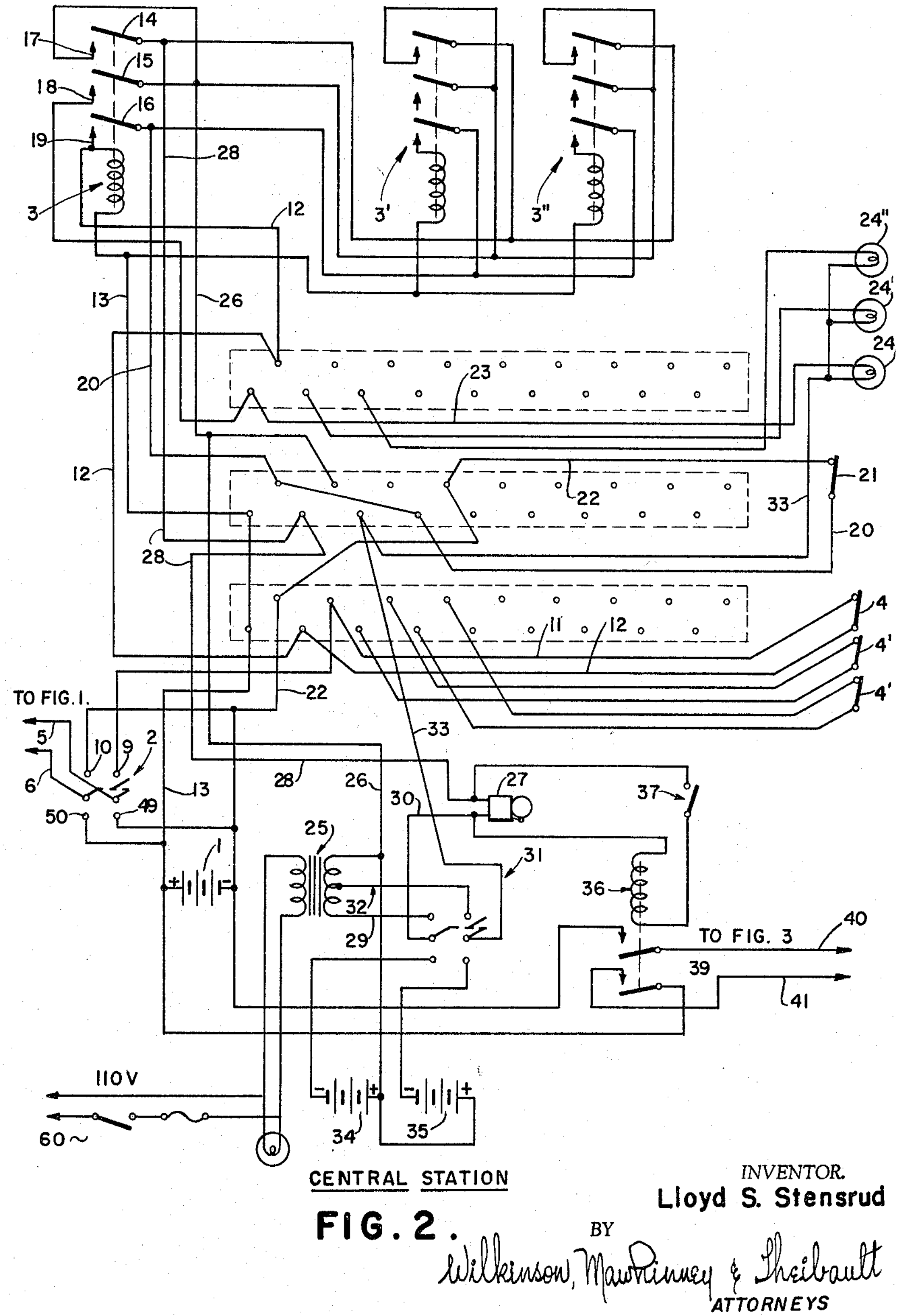
FIG. 2 is an electrical schematic diagram of the central station circuitry of the subscriber alarm system of the invention.

Referring to the drawings in greater detail, and particularly FIG. 2, the main control circuitry at the central station, for each subscriber station comprises a battery 1 for energizing the control circuitry, a double-pole double-throw switch 2 for connecting the battery in the correct polarity to the subscriber station for the particular purpose intended, a relay 3 for controlling the alarm circuitry for the particular subscriber station, and a subscriber station cut-off switch 4, connected in a series circuit such that the circuit at the subscriber station, shown in FIG. 1, and connected thereto through double-pole double-throw switch 2, serves as a switch for completing the main control circuit when an event such as an unauthorized intrusion, fire, or the like, occurs at the subscriber station.

The subscriber station circuitry shown in FIG. 1, which may be remotely located from the central station circuitry shown in FIG. 2, is connected to the central station by means of a two wire conductor 5, 6 with the basic circuitry at the subscriber station being an alarm-initiating contact 7 connected across conductors 5 and 6. The alarm-initiating contact 7 has been shown schematically in FIG. 1 as a switch, but it is to be understood that this contact for jumpering lines 5 and 6 can be any of the well known intruder detection devices on the market which cause a circuit to be closed on detection of an unauthorized intrusion. A plurality of such devices, as represented at 7, may be connected in parallel with each other and the lines 5 and 6, and in addition fire detection devices, indicated schematically at 8, may also be connected across the lines so that a warning will be transmitted to and indicated at the central station if there is a fire or an unauthorized intrusion at the subscriber station. It is to be understood that devices 7 and 8 are normally open and cause a short circuit across lines 5 and 6 only upon the occurrence of a certain type event.

The opposite ends of conductors 5 and 6 are connected to the movable contactor of double-pole double-throw switch 2 as indicated in FIG. 2. In normal operation, switch 2 is thrown to connect conductor 5 to contact 9 and conductor 6 to contact 10. Contact 9 is connected to the positive side of central station battery 1, which may be a 48 volt battery, through a series circuit including conductor 11, subscriber station cut-off switch 4, conductor 12, the coil of relay 3, and conductor 13. Contact 10 is connected to the negative side of battery 1 and since during normal operation cut-off switch 4 is normally closed, closure of an alarm-initiating contact 7 or a fire detection device 8 at the subscriber station is all that is required to energize the main control circuitry at the central station. Upon closure of either device 7 or 8 by an unauthorized intrusion or a fire at the subscriber station causes the potential of battery 1 to be impressed across the coil of relay 3 thus energizing the same. When relay 3 is energized its movable contactors 14, 15 and 16 are moved into electrical contact with fixed normally open contacts 17, 18 and 19, respectively, to close three different circuits. Contact 19 and contactor 16 are connected into a relay-holding circuit which maintains the relay in an energized state, once it has been energized, even if the alarm-initiating contact 7 at the subscriber station is subsequently opened. Contact 19 is connected to one end of the coil of relay 3, while the opposite end of the coil, as previously indicated, is connected by means of conductor 13 to one terminal of battery 1. Movable contactor 16 is connected to the opposite terminal of battery 1 through the circuit comprising conductor 20, master switch 21, which is normally closed, and conductor 22 such that, when contacts 16 and 19 close, the potential of battery 1 is also applied across the coil of relay 3 by the circuit just described, so as to maintain the relay energized; no matter what occurs at the subscriber station. Relay 3 cannot be reset until the alarm-initiating contact 7 or fire detection device 8 are open-circuited and master switch 21 is opened to cause the relay to become deenergized.

The central station includes an audible alarm system and a visual alarm system for each subscriber station for indicating from which subscriber station the alarm-initiating signal originated. Contacts 15 and 18 of relay 3 control the visual alarm circuit, while contacts 14 and 17 of the relay control the audible alarm circuit. Fixed contact 17 is connected to one end of the secondary winding of power supply transformer 25 by means of conductor 26. Movable contactor 14 is connected to one side of alarm bell 27 by conductor 28 while the opposite side of the bell is connected to the opposite side 29 of the transformer secondary winding through conductor 30 and one side of double-pole double-throw switch 31. When contacts 14 and 17 of the relay close the voltage across the secondary winding of transformer 25 is connected to energize the alarm bell 27 to render an audible alarm, indicating that an unnatural event has occurred at one of the subscriber stations. Power supply transformer 25 is energized by a source of A.C. power, available at the central station, such as the normal 110 volt, 60 cycle power supplied by the public utility companies.

As relay contacts 14 and 18 close simultaneously with contacts 14 and 17, they energize a lamp indicating which subscriber station has caused the alarm. Fixed contact 18 is connected to one side of indicating lamp 24 which is the indicating lamp for the subscriber station, shown in FIG. 1, by means of conductor 23, while the other side of the lamp is connected to the center tap 32 of the secondary of transformer 25 by means of conductor 33 and the other side of double-pole double-throw switch 31. Movable contactor 16 is connected to one end of the secondary winding of transformer 25 by means of conductor 26 to complete the power circuit for the indicating lamp 24. Double-pole double-throw switch 31 is connected to provide emergency battery power in the event of failure of the A.C. power which energizes transformer 25. As shown in FIG. 2, the contacts on one side of switch 31 are connected to the secondary winding of transformer 25, while the contacts on the opposite side of the switch are connected to the terminals of batteries 34 and 35 which have their opposite terminals connected in common to conductor 26. These batteries may be 6 volt batteries, and it is readily apparent to one skilled in the art that when double-pole double-throw switch 31 is thrown to disconnect transformer 25 from the circuit and connect the batteries 34 and 35 into the circuit, battery 35 is placed in circuit with the indicating lamp 24 while battery 34 is placed in circuit with the alarm bell 27. If desired, auxiliary relay 36 is connected across alarm bell 27 with a switch 37 connected in circuit therewith to disable or enable its operation. With switch 37 closed, relay 36 will be energized whenever alarm bell 27, at the central station, is energized. The purpose of relay 36 is to provide for the simultaneous sounding of a secondary alarm at another location whenever the alarm 27 at the central station is energized. When relay 36 is energized, the potential of station battery 1 energizes remote relay 38 through the fixed and movable contacts 39 of relay 36 and connecting conductors 40 and 41.

Figure 3:
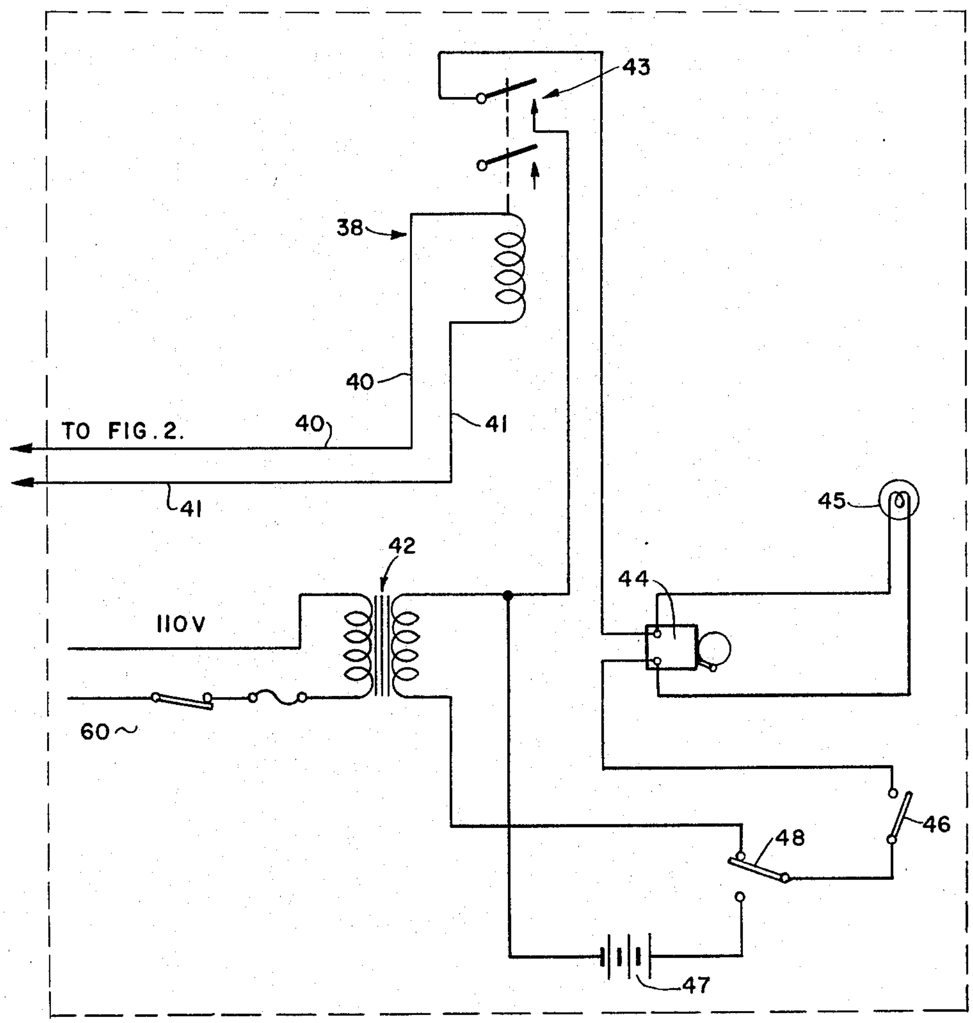
FIG. 3 is a schematic diagram of a secondary alarm circuit.

The secondary alarm unit shown in FIG. 3 includes a power supply transformer 42 which is powered by a source of A.C. current at the locale where the secondary alarm is installed. Remote relay 38 is provided with a pair of contacts 43 which close when the relay is energized to connect the output voltage of the transformer in series circuit with remote alarm bell 44 to sound the alarm. An indicating lamp 45 is connected in parallel with bell 44 to render a visual as well as an audible alarm at the remote location. An optional switch 46 may be provided in series with the remote alarm bell circuit and it is to be understood that this switch must be closed for proper operation of the remote alarm. The secondary or remote alarm circuit is also provided with an emergency battery power supply 47 which may be switched into the circuit in place of transformer 42 by means of emergency power switch 48, if a power failure develops at the location where the secondary or remote alarm is installed.

The remote subscriber station circuitry, shown in FIG. 1, is provided with means which enables a reverse audible signal to be sounded at the subscriber station by manipulating double-pole double-throw switch 2 at the central station. This circuit loop may be used as a warning loop whereby the master station may send out warning signals to its subscribers in case of national emergency, extremely severe weather, or other types of emergencies. A code system could be arranged between the central and subscriber stations with a different audible code provided for each different type of emergency which may arise so that the subscriber will immediately know what he is being warned against.

When the central station wishes to send a signal to a particular subscriber, the movable member of the double-pole double-throw switch 2, for the particular subscriber station, is thrown to connect conductor 5 to contact 49, and thus to the negative side of battery 1, and conductor 6 to contact 50 and thus to the positive side of battery 1. It will be noted that this is the reverse potential of that impressed upon conductors 5 and 6 during normal operation of the alarm system. At the subscriber station the coil of relay 51 is connected in series circuit with diode rectifier 52 across conductors 5 and 6 which connect the subscriber station to the central station. Diode rectifier 52 is connected in the circuit such that it will conduct current to energize relay 51 only when the proper polarity voltage from battery 1 is applied thereto, and double-pole double-throw switch 2 is arranged such that when it is in the position 9, 10 the voltage polarity on lines 5 and 6 is such as to prevent conduction of the diode circuit; but when in the position 49, 50 the polarity is such as to cause conduction of the diode and energization of relay 51. The contacts 53 of relay 51 are connected in series circuit with subscriber alarm bell 54, On-Off switch 55 and the secondary winding of power supply transformer 56 which is energized by a source of A.C. current at the subscriber station. When relay 51 is energized, contacts 53 close to sound the alarm bell 54. Thus by manipulating the switch 2 at the central station an alarm or warning signal can be sounded at the subscriber station. An emergency power supply switch 57 is provided in the alarm circuit for switching battery 58 into the circuit and transformer 56 out of the circuit, in event of failure of the A.C. current source powering the transformer at the subscriber station. A plurality of alarm-initiating devices, indicated schematically at 7′, similar to alarm-initiating contact 7, and/or fire detection devices 8′, similar to that indicated at 8, may be connected in the alarm circuit in parallel with the contacts 53 of relay 51 so that either closure of the fire detection devices 8′, intruder alarm devices 7′, or the relay contacts 53, will cause alarm bell 54 to be energized. The addition of devices 7′ and 8′ at this point in the circuit is made when the subscriber desires the event which occurs at his station to sound an alarm at his station as well as at the central station. An intrusion or fire at the subscriber station will sound the alarm at the subscriber station even if the circuitry of the central station, or other components in the system, have failed, so that no alarm would be initiated at the central station. Devices 7′ and 8′, as well as devices 7 and 8, do not interfere with operation of the reverse alarm circuit in the central station, since these devices are in the normally open state and close only upon the occurrence of certain events. When the subscriber alarm system is returned to its normal operation of monitoring the conditions at the subscriber station or stations, the movable contactor of switch 2 is positioned to make electrical contact with contacts 9 and 10.

The fire detection devices 8 and 8′ may be cotton insulated copper wire coils or other types of fire alarm contacts or detecting devices which complete a circuit upon the occurrence of the event they are to detect.

If an intruder attempts to sever conductors 5 and 6 simultaneously with wire cutters, or the like, a short circuit will be produced across the lines, resulting in the energizing of relay 3 at the central station and the sounding of the alarm. Thus the system is relatively tamper-proof, since any tampering whatever, which would cause a short circuit across lines 5 and 6, will initiate an alarm. The intruder detecting devices 7 and 7′ at the subscriber station may have double sets of contacts for connecting each device into each of the circuits at the subscriber station.

While only one subscriber station circuit has been shown in FIG. 1, connected to the central station circuit of FIG. 2, it is to be understood that a plurality of subscriber stations can be connected to the central station by merely adding parallel channels at the central station. Each subscriber station requires its own double-pole double-throw switch 2, relay 3, indicating lamp 24, and cut-off switch 4. Relays 3′ and 3″ and corresponding indicator lamps 24′ and 24″ and On-Off switches 4′ and 4″ for two additional individual subscriber stations have been shown partly connected in FIG. 2. All of the relays 3—3″ would operate off of the single central station battery 1 and the indicator lamp circuits for the individual stations would also operate off of the same transformer power supply 25 or emergency battery supply 35. The audible bell alarm system 27 would normally be common to all subscriber stations with the indicator lamps being used to pinpoint the particular subscriber station causing the alarm.

Switches 4, 4′ and 4″ are used at the central station for interrupting the circuit to the corresponding subscriber station so that the central station circuits can be reset to continue monitoring the other stations after an alarm has been initiated by one of the subscribers. If an alarm signal continues to come in from a particular subscriber, once help has been sent to the station for investigation, the switch 4 for the station can be opened so that central station circuitry can be reset. Master switch 21 is also opened to break the holding-circuit for relay 3 to allow it to be reset. Once the relay is reset switch 21 is again closed. When the devices 7 and/or 8, initiating the alarm at the subscriber station, have been open-circuited, the switch 4 at the central station can again be closed for that particular subscriber, so that his station can again be put under constant surveillance.

While the invention has been described in certain preferred embodiments it is realized that modifications can be made without departing from the spirit of the invention and it is to be understood that no limitations upon the invention are intended other than those imposed by the scope of the appended claims.

What I claim as new and desire to secure by Letters Patent of the United States, is as follows:

1. An alarm system comprising a pair of conductors connecting a remote circuit to a central alarm circuit, means at the remote circuit for completing a circuit between said pair of conductors on the occurrence of an event, alarm means and a unidirectional current element connected in series circuit across said pair of conductors at the remote circuit, said central alarm circuit including a source of potential, switch means having at least two positions, second alarm means connected in circuit with said source of potential and said switch means, said switch means connected to said pair of conductors and adapted in one position to connect said conductors in circuit with said source of potential and second alarm whereby said second alarm is energized by said means at the remote circuit upon the occurrence of an event, and said switch means adapted in the other position to connect said conductors in circuit with said source of potential to cause current flow through said unidirectional current element and energize said alarm means at the remote circuit whereby reverse signaling is obtained in said pair of conductors.

2. An alarm system as set forth in claim 1 in which said switch means is connected to reverse the polarity connection of said source of potential to said pair of conductors.

3. An alarm system as set forth in claim 1 in which said unidirectional current element is a diode rectifier.

4. An alarm system comprising a pair of conductors, means connected at one end of said pair of conductors to shunt the same upon the occurrence of an event, switch means connected to the other end of said pair of conductors, said switch means having a first and second position, alarm actuator relay means, a source of potential and said alarm actuator relay means connected in series circuit with the first position of said switch means whereby when said switch is in said first position said alarm actuator relay means is energized upon the shunting of said pair of conductors by said means connected thereto, said source of potential oppositely connected to the second position of said switch means, and alarm circuit means connected across said pair of conductors at said one end for energization when said switch means is in said second position.

5. An alarm system as set forth in claim 4 in which said alarm circuit means includes a diode rectifier element and an alarm actuator relay connected in series across said pair of conductors.

6. An alarm system comprising a pair of conductors, detection means connected at one end of said pair of conductors and adapted to shunt the same upon the occurrence of an event, switch means connected to the opposite end of said pair of conductors, said switch means having a first and second position, alarm actuator relay means, a source of potential connected in series circuit with said alarm actuator relay means to the first position of said switch means, whereby when said switch is in said first position said alarm actuator relay means is energized upon shunting of said pair of conductors by said detection means, said source of potential oppositely connected to the second position of said switch means, a unidirectional current element and a relay coil connected in series across said pair of conductors at said one end and arranged to be energized when said switch means is in said second position, alarm means, a second potential source, and contactors connected with said relay coil and in series circuit with said second potential source and said alarm means to energize the latter when said switch means is moved to said second position.

7. An alarm system as set forth in claim 6, including circuit-closing detection devices connected in parallel with said contactors in said series circuit with said relay current and second potential source.

8. An alarm system as set forth in claim 6 in which said alarm actuator relay means includes an alarm relay coil connected in series circuit with said source of potential, another source of potential, an indicating lamp, a first set of contacts connected with said alarm relay coil and in series with said indicating lamp and said another source of potential, a second set of contacts connected with said alarm relay coil, and an audible alarm connected in series circuit with said second set of contacts and said another source of potential whereby a visual and audible alarm are provided when said alarm relay coil is energized.

9. An alarm system as set forth in claim 8, and a third set of contacts connected in series circuit with said alarm relay coil and said source of potential to provide a holding-circuit for said alarm relay coil.

References Cited by the Examiner

UNITED STATES PATENTS

| | | | |
|---|---|---|---|
| 584,463 | 6/1897 | Creelman | 340—274 X |
| 2,424,243 | 7/1947 | Lowell | 340—147 |
| 3,010,100 | 11/1961 | Muehter | 340—276 |
| 3,029,420 | 4/1962 | Bagno. | |
| 3,069,673 | 12/1962 | Ward | 340—276 |
| 3,133,276 | 5/1964 | Miller | 340—276 |
| 3,171,116 | 2/1965 | Conigliaro | 340—276 |

FOREIGN PATENTS

| | | |
|---|---|---|
| 828,560 | 1/1952 | Germany. |
| 337,896 | 11/1930 | Great Britain. |

NEIL C. READ, *Primary Examiner.*

R. M. GOLDMAN, *Assistant Examiner.*